United States Patent [19]

Urano et al.

[11] 4,180,311

[45] Dec. 25, 1979

[54] INTERLOCKING DEVICE FOR INDICATION IN THE FINDER OF A SINGLE-LENS REFLEX CAMERA

[75] Inventors: Fumio Urano, Omiya; Akihiro Arai, Urawa, both of Japan

[73] Assignee: Asahi Kogaku Kogyo Kabushiki Kaisha, Tokyo, Japan

[21] Appl. No.: 906,805

[22] Filed: May 17, 1978

[30] Foreign Application Priority Data

May 31, 1977 [JP] Japan .............................. 52-70195[u]

[51] Int. Cl.[2] ...................... G03B 17/20; G03B 19/12
[52] U.S. Cl. ...................................... 354/53; 354/155
[58] Field of Search .................. 354/288, 289, 53, 57, 354/61, 150-155

[56] References Cited

U.S. PATENT DOCUMENTS

| | | | |
|---|---|---|---|
| 3,630,133 | 12/1971 | Shimomura | 354/155 |
| 3,630,134 | 12/1971 | Nakamura | 354/155 |
| 3,668,993 | 6/1972 | Kurie | 354/155 |
| 4,087,829 | 5/1978 | Veda et al. | 354/53 X |

Primary Examiner—Donald A. Griffin
Attorney, Agent, or Firm—Sughrue, Rothwell, Mion, Zinn and Macpeak

[57] ABSTRACT

An indicator device extending into the optical path of a removable mirror box is controlled by a spring biased coupling system mounted on the box. A coupling gear in the coupling system meshes with a drive gear on the camera body and is provided with a locking mechanism for securing the position of the indicator when the mirror box is removed.

3 Claims, 4 Drawing Figures

INTERLOCKING DEVICE FOR INDICATION IN THE FINDER OF A SINGLE-LENS REFLEX CAMERA

BACKGROUND OF THE INVENTION

This invention relates to single-lens reflex cameras, and more particularly to an interlocking device for an indication device in the finder of a single-lens reflex camera.

In a single-lens reflex camera whose pentaprism is replaceable, the coupling mechanism for controlling the exposure-meter indication mechanism, the exposure data (lens stop values, shutter speeds, etc.) displaying mechanism, etc. are included in the pentaprism housing or in the camera body. In a camera with the coupling mechanism provided in the pentaprism housing, the latter is, in general, necessarily large because of its pentaprism function and also the configuration of the coupling mechanism which it must contain. Thus, such an arrangement is not preferable from the point of view of operability, weight, balance and design. On the other hand, in a camera in which the coupling mechanism is provided in the camera body, data must be optically transmitted into the finder's optical system because positioning the indication mechanism within the optical system would unacceptably interfere with the assembly and/or removal of the mirror box. Therefore, the dimension, brightness and visibility of the indication data are often insufficient. Accordingly, in the camera with a replaceable pentaprism, it is desirable that the data indicator be of the direct-viewing type by providing it in the field of vision in the vicinity of the focal plate. However, since this direct-viewing type indicator is integral with the finder's optical system, that is, is mounted on the mirror box, the coupling section to the operation section provided on the camera body will need adjustment during an assembling process or a disassembling process for repair, which leads to a reduction in production.

SUMMARY OF THE INVENTION

It is an object of this invention to provide a single-lens reflex camera in which the camera assembling efficiency is improved and the indication data can be readily viewed. Briefly, this is accomplished by providing on the mirror box an indication device extending into the finder optical system, a wire for controlling the position of the indication device, the wire being resiliently anchored at one end and connected to a coupling gear at its other end and a locking mechanism for securing the position of the coupling gear. The coupling gear meshes with an indicator drive gear system on the camera body wnen the mirror box is assembled in the camera and the locking mechanism is disengaged to permit operation of the indicator by the dial on the camera body. The locking mechanism is engaged prior to removal of the mirror box to prevent the movement of the indicator.

BRIEF DESCRIPTION OF THE DRAWINGS

This present invention will now be described with reference to the drawing in which.

DETAILED DESCRIPTION OF THE INVENTION

Figure 1:
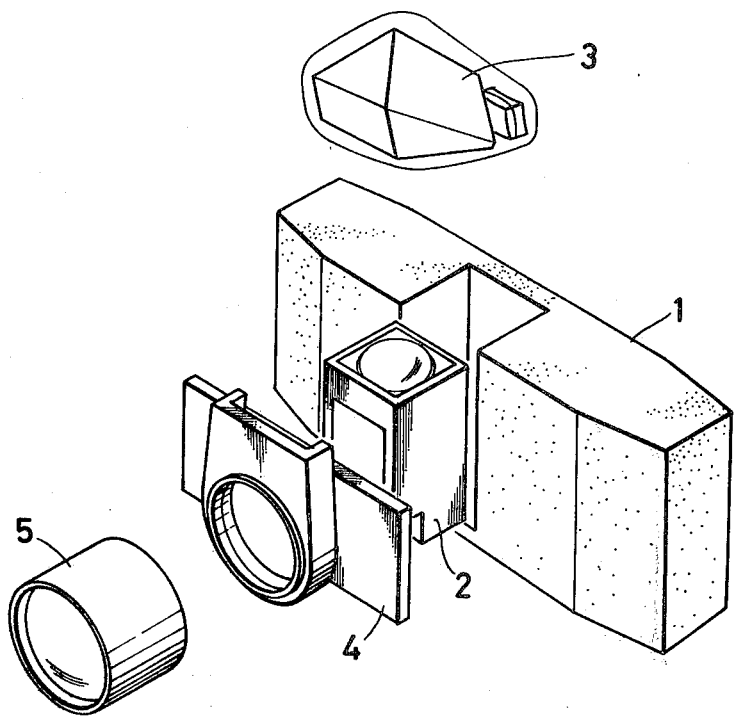
FIG. 1 is a perspective view showing an ordinary arrangement of a single-lens reflex camera.
Figure 2:
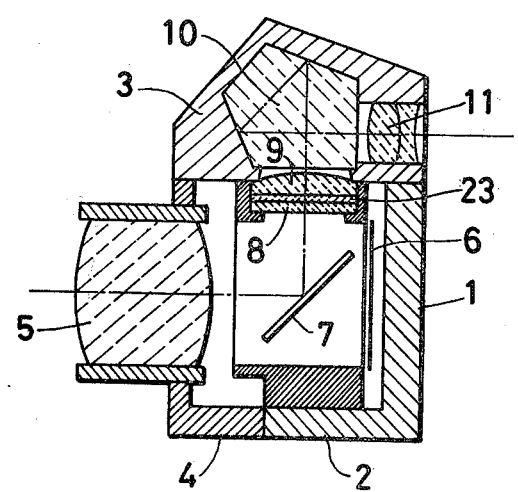
FIG. 2 is a sectional view illustrating in more detail the ordinary arrangement of the single-lens reflex camera shown in FIG. 1.

Shown in FIG. 1 is an ordinary single-lens reflex camera comprising a body 1, a mirror box 2, a pentaprism housing 3, a front plate 4, and a photographing lens 5. As shown more specifically in FIG. 2, the finder optical system is made up of the aforementioned photographing lens 5, a mirror 7, a focal plate 8, a condenser lens 9, a pentaprism 10, and a magnifier 11. Reference numeral 23 designates an indication member pointer which is provided between the focal plate 8 and the condenser lens 9.

Figure 3:
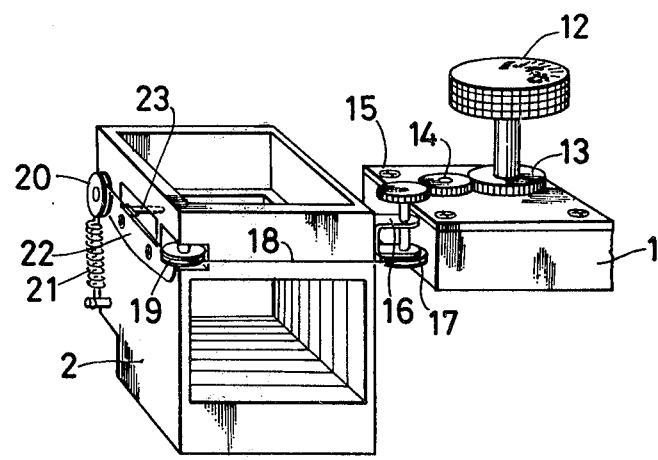
FIG. 3 is a perspective view showing an embodiment of this invention.
Figure 4:
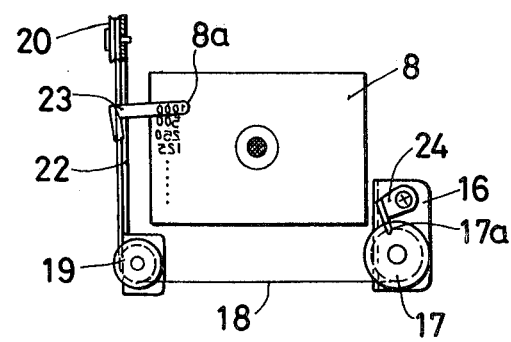
FIG. 4 is a plan view (partly in section) showing essential parts of the embodiment shown in FIG. 3.

The technical concept of this invention will become apparent from FIGS. 3 and 4. Referring to these figures, a shutter dial 12 (or an operating member) is rotated together with a gear 13. The shutter dial 12 and the gear 13 together with a coupling gear 14 are provided on the body 1. A gear 15 engaging the gear 14 is supported by a bearing 16 provided on the mirror box 2, and is rotated integrally with a winding pulley 17. The pointer 23 is fastened to a wire 18 which is laid over the winding pulley 17 and other pulleys 19 and 20 in such a manner that the wire's extending direction is changed at each of the pulleys 19 and 20. One end portion of the wire 18 is wound on the pulley 17, while the other end portion is pulled by a spring 21 secured to the mirror box. The pointer 23 is extended inside the mirror box 2 into the finder optical system to indicate a shutter speed scale 8a. A locking pawl 24 is provided to lock the winding pulley 17. When it is necessary to remove the mirror box 2 from the body the locking pawl is set at the locking position to cancel the elastic force of the spring 21. In connecting the mirror box to the body 1, after the gear 16 is engaged with the gear 14, the locking pawl 24 is disengaged from the pulley to exert the elastic force of the spring 21 on the gear 15 and permit operation of the indicator 23 by the operating member 12.

Thus, in the assembled state, the gears 13, 14 and 15 are turned by rotating the shutter dial 12, as a result of which the winding pulley 17 winds or unwinds the wire 18 to which tensile force and restoring force are applied by the spring 21. The wire 18 is guided to the display section by means of the pulleys 19 and 20, and the shutter speed scale 8a on the focal plate 8 is indicated by the pointer secured to the wire 18. If the winding pulley 17 is locked with the locking pawl 24, and thereafter the gear 14 is disengaged from the gear 15, then the mirror box 2 can be readily removed from the body 1. Similarly, the mirror box 2 can be readily connected to the body 1. In addition, in the case where the mirror box is connected to the body with a predetermined positional relationship between the pointer 23 and the wire 18, the locking position of the winding pulley 17 with the locking pawl 24 can be determined by engaging the latter with a slot 17a of the winding pulley and the pointer 23 will be secured by the pawl at a certain set value (for instance "1000"). Thereafter, if the shutter dial 12 is set to the same set value ("1000"), the adjustment after reassembly can be eliminated.

In the above-described embodiment, the mirror box is removed from the body by disengaging the gears; however, it will be appreciated that the mirror box may be axially removed as well by using a coupling which can transmit rotation.

It will be obvious that the above-described arrangement according to this invention can be applied to a camera in which the finder is not replaceable. Furthermore, although the invention has been described with respect to the shutter speed indication, the technical concept of the invention can be applied to indicators of the lens stop value (in this case, the front plate would be employed instead of the body), film sensitivity, exposure correcting data, number of frames, etc.

Thus, according to this invention, an interlocking device for the indication means in the finder of the single-lens reflex camera can be provided in which the mirror box can be readily engaged with and disengaged from the body.

What is claimed is:

1. In a camera having removable optical components and an indicating device mounted on a first camera component and extending into the optical path of the camera viewfinder, said indication device controlled by a first element which is mounted on a second camera component and rotatable by the camera operator, the improvement comprising:

a second rotatable element operatively coupled to said indication device and mounted on said first camera component, said second rotatable element being coupled to said first rotatable element and transmitting the rotation of said first rotatable element to said indication device when said first and second camera components are assembled, said first and second rotatable elements being easily disengagable for removal of said first camera component; and locking means for securing the rotatable position of said second rotatable element to prevent free rotation thereof when said first and second rotatable elements are disengaged.

2. A camera according to claim 1, wherein said second rotatable element is a gear.

3. A camera according to claims 1 or 2, wherein said first camera component is a mirror box and said second camera component is the camera body.

* * * * *